(12) United States Patent
Stahl et al.

(10) Patent No.: US 11,634,057 B2
(45) Date of Patent: Apr. 25, 2023

(54) LOWER LEG SUPPORT DEVICE FOR A VEHICLE SEAT, AND VEHICLE SEAT

(71) Applicant: Volkswagen Aktiengesellschaft, Wolfsburg (DE)

(72) Inventors: Arne Stahl, Gifhorn (DE); Tim Brueckner, Braunschweig (DE); Matthias Koehler, Meine (DE); Christian Busch, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 104 days.

(21) Appl. No.: 17/476,066

(22) Filed: Sep. 15, 2021

(65) Prior Publication Data
US 2022/0001783 A1    Jan. 6, 2022

Related U.S. Application Data

(63) Continuation of application No. PCT/EP2020/056749, filed on Mar. 15, 2020.

(30) Foreign Application Priority Data

Mar. 15, 2019 (DE) .................... 10 2019 203 553.1

(51) Int. Cl.
*B60N 2/02* (2006.01)
*B60N 2/90* (2018.01)

(52) U.S. Cl.
CPC .................... *B60N 2/995* (2018.02)

(58) Field of Classification Search
CPC .. B60N 2/995; B60N 2/02; B60N 2002/0212; B60N 2002/0216; B60N 2002/0236; B60N 2002/024
(Continued)

(56) References Cited

U.S. PATENT DOCUMENTS 6,450,579 B1   9/2002   Nylander et al.
6,866,341 B2   3/2005   Behnert
(Continued)

FOREIGN PATENT DOCUMENTS

CN   201769707 U   3/2011
CN   108621891 A   10/2018
(Continued)

OTHER PUBLICATIONS

Chinese Office Action dated Dec. 20, 2022 in corresponding application 202080016968.7.
(Continued)

*Primary Examiner* — Mark R Wendell
(74) *Attorney, Agent, or Firm* — Muncy, Geissler, Olds & Lowe, P.C.

(57) ABSTRACT

A lower leg support device for a vehicle seat, with a bracket and with a lower leg support displaceably arranged on the bracket, which can be moved between a non-use position and a use position upstream in longitudinal extension, wherein the lower leg support has at least two support parts which are moveable relative to each other to increase or reduce a lower leg support surface of the lower leg support. It is provided that the support parts can be moved transversely to the longitudinal extension to each other in order to increase or reduce the width of the lower leg support surface.

14 Claims, 2 Drawing Sheets

(58) Field of Classification Search
USPC .................................................. 297/423.32
See application file for complete search history.

(56) References Cited

U.S. PATENT DOCUMENTS

| | | | |
|---|---|---|---|
| 10,368,648 B2 | 8/2019 | Hoggarth et al. | |
| 10,525,861 B2 | 1/2020 | Line et al. | |
| 2002/0109390 A1* | 8/2002 | Hagiike | B64D 11/0643 |
| | | | 297/423.36 |
| 2005/0173963 A1 | 8/2005 | Edrich et al. | |
| 2007/0016119 A1* | 1/2007 | Inada | A61H 9/0078 |
| | | | 601/151 |
| 2008/0116732 A1 | 5/2008 | Hiatt | |
| 2012/0091779 A1* | 4/2012 | Chang | B60N 2/995 |
| | | | 297/423.3 |
| 2015/0305507 A1* | 10/2015 | Besler | A47C 7/5062 |
| | | | 297/423.28 |

FOREIGN PATENT DOCUMENTS

| | | |
|---|---|---|
| DE | 4125416 A1 | 2/1993 |
| DE | 10003407 A1 | 8/2001 |
| DE | 102006006174 A1 | 8/2007 |
| DE | 102007042489 A1 | 3/2009 |
| DE | 102010030553 A1 | 12/2011 |
| DE | 102018106403 A1 | 9/2018 |
| EP | 3406483 A1 | 11/2018 |
| FR | 2972399 A1 | 9/2012 |
| GB | 0509388 | 6/2005 |
| JP | 2008237295 A | 10/2008 |
| JP | 2010017353 A | 1/2010 |
| JP | 2012196407 A | 10/2012 |

OTHER PUBLICATIONS

International Search Report dated Jul. 3, 2020 in corresponding application PCT/EP2020/056749.

* cited by examiner

LOWER LEG SUPPORT DEVICE FOR A VEHICLE SEAT, AND VEHICLE SEAT

This nonprovisional application is a continuation of International Application No. PCT/EP2020/056749, which was filed on Mar. 13, 2020 and which claims priority to German Patent Application No. 10 2019 203 553.1, which was filed in Germany on Mar. 15, 2019, and which are both herein incorporated by reference.

BACKGROUND OF THE INVENTION

Field of the Invention

The present invention relates to a lower leg support device for a vehicle seat, with a bracket assignable to the vehicle seat and with a lower leg support arranged on the bracket, which is arranged to be displaceable between a non-use position and a position of use upstream in longitudinal extension, wherein the lower leg support has at least two support parts that are movable relative to each other to increase or reduce a lower leg support surface area of the lower leg support.

Furthermore, the invention relates to a vehicle seat for a motor vehicle, with a seat part, with a backrest assigned to the seat part and with a lower leg support device arranged on the seat part.

Description of the Background Art

Lower leg support devices are already known from the prior art. For example, the patent application DE 10 2010 030 553 discloses a lower leg support device for a vehicle seat which has a pivotably mounted support part which can be pivoted from an essentially vertically aligned non-use position to a swung-out, horizontally aligned position of use. From the patent application DE 10 2018 106 403 A1, which corresponds to US 2018/0272904, a generic lower leg support device is known, in which also a support part can be pivoted from a non-use position to a use position, wherein the lower leg support is formed of multiple parts. For this purpose, several support parts located one behind the other in longitudinal extension are hingedly connected to each other, so that they can be pivoted one after the other into the use position, whereby the lower leg support can be extracted in its longitudinal extension.

SUMMARY OF THE INVENTION

It is therefore an object of the present invention to provide an improved lower leg support device that increases user comfort.

The object underlying the invention is achieved by a lower leg support device and has the advantage that the user has a more comfortable contact surface at their disposal, which offers increased freedom in the position of their legs on the lower leg support. According to an exemplary embodiment of the invention, it is provided that the support parts can be shifted transversely to the longitudinal extension to each other, so that they increase or reduce the width of the lower leg support surface by their displacement. By reducing the lower leg support surface, for example, it is possible for the user to take their foot off the lower leg support more easily and place it on the floor. There is more space left in the foot area, for example, to grasp objects lying on the floor or the like. By widening the lower leg support surface, the user can comfortably place their legs on the lower leg support, even if these are not close together or directly adjacent. This increases ease of use of the lower leg support. In addition, there is the possibility that by reducing the support width, less installation space is necessary for storing the lower leg support in the non-use position, which makes the lower leg support easier to integrate into the vehicle seat in a more space-saving manner.

A first of the support parts can be displaceably arranged on the bracket and at least a second of the support parts is displaceably arranged on the first support part. The first support part thus represents the connection to the bracket and allows for the lower leg support to be adjusted from the use position to the non-use position and vice versa. The second support part can be displaced on the first support part, so that on the one hand it is shifted along with the first support part, and on the other hand it can be easily moved relative to the first support part in order to increase or reduce the lower leg support area.

In particular, on the first support part, two second support parts can be arranged in a displaceable manner on sides of the first support part facing away from each other. As a result, the lower leg support surface is increased or reduced by shifting both support parts. For example, it is conceivable to move only one of the two support parts to increase the lower leg support area. Preferably, however, the support parts are coupled to each other in such a way that both second support parts are always displaced, so that a symmetrical change of the lower leg support surface is ensured.

Each second support part on the first support part can be moved from a retracted storage position into an extracted use position and vice versa. In the extracted use position, the second support part widens the lower leg support surface, while in the retracted storage position it narrows the contact surface. With the movable arrangement of the second support parts on the first support part, a simple and robust mechanism is provided, which allows for the lower leg support surface to be increased or reduced.

Preferably, the second support part can be in each case mounted on the first support part by a rail guide. The rail guide can be provided cost-effectively and allows for easy operation of the lower leg support device. In particular, the rail guide is formed by the first and second support parts in that the second support part is guided in a form-fitting manner on the first support part. In particular, the second support part is designed in such a way that it covers the first support part at least partially at least in the storage position, so that the second support part covers the first support part in the storage position at least partially. In the extracted use position, the second support part then frees the first support part at least substantially, so that the total lower leg support surface is formed by the first and the second support part.

Preferably, the lower leg support device can have at least one controllable actuator, which is assigned to the second support part for its displacement. This ensures automated movement of the second support part in an advantageous manner. The actuator is designed in particular as an electromotive, pneumatic and/or hydraulic actuator.

Preferably, the actuator can be coupled by means of a gearbox with the two support parts for their displacement, so that by means of a single actuator, both second support parts are advantageously displaceable.

For example, the first support part can be mounted in a longitudinally displaceable manner, so that the user can optimally adapt the position of the first support part, i.e., of the lower leg support, to their needs.

The first support part can be assigned a controllable actuator for its longitudinal displacement, which may be an actuator that is separate from the aforementioned actuator or is formed by the already mentioned actuator. This enables automatic adjustment of the first support part in its longitudinal displacement.

The actuator can be firmly connected to the first support part and coupled to a spindle rod, which is attached to the bracket at one end, wherein the actuator has in particular a spindle nut and can be moved by its control along the spindle rod. By controlling the actuator, the latter is then moved along the spindle rod, which is attached to the bracket, wherein the first support part is also moved due to its firm connection to the first support part. This ensures the aforementioned longitudinal displacement of the first support part by the actuator in a simple way.

Preferably, on its other end the spindle rod can be pivotably connected to at least one coupling rod, which is connected to one of the second support parts, in particular in a hinged manner, preferably directly connected by a joint, wherein the coupling rod with the spindle rod forms an acute angle in the retracted storage position. Because the second support part is transversely displaceably mounted on the first support part and the first support part is firmly connected to the actuator that can be moved along the spindle rod, the longitudinal displacement of the first support part along the spindle rod causes the coupling rod to move the second support part away from the bracket outwards when moving the first support part, thereby increasing the lower leg support area. Thus, a single actuator causes the first support part to be moved longitudinally and the second support part to be moved transversely thereto so as to increase or reduce the contact surface. The sharp angle ensures that starting from the storage position, spreading the coupling rod, or increasing this angle by moving the first support part away from the bracket, is always possible and no self-locking occurs. Conveniently, both second support parts are coupled to the end of the spindle rod via a corresponding coupling rod, so that both support parts are also moved.

Preferably, the first support part can be pivoted on the bracket, so that the lower leg support as a whole can be swung from a non-use position, in particular substantially horizontally formed, to the use position, in particular vertically formed or at least inclined.

Preferably, an actuator for pivoting the first support part can be assigned to the bracket, so that an automated pivoting of the first support part from the use position to the non-use position or vice versa is possible. Optionally or alternatively, the lower leg support can be coupled with the seat adjustment device of the vehicle seat, so that in the event of a change in the seated position, for example from an upright sitting position to a reclining position, the lower leg support is automatically shifted to the use position. For this purpose, for example, a mechanical coupling of the lower leg support device with the vehicle seat or its seat adjustment device is produced.

The vehicle seat according to the invention is characterized by the inventive design of the lower leg support device. This results in the advantages already mentioned.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
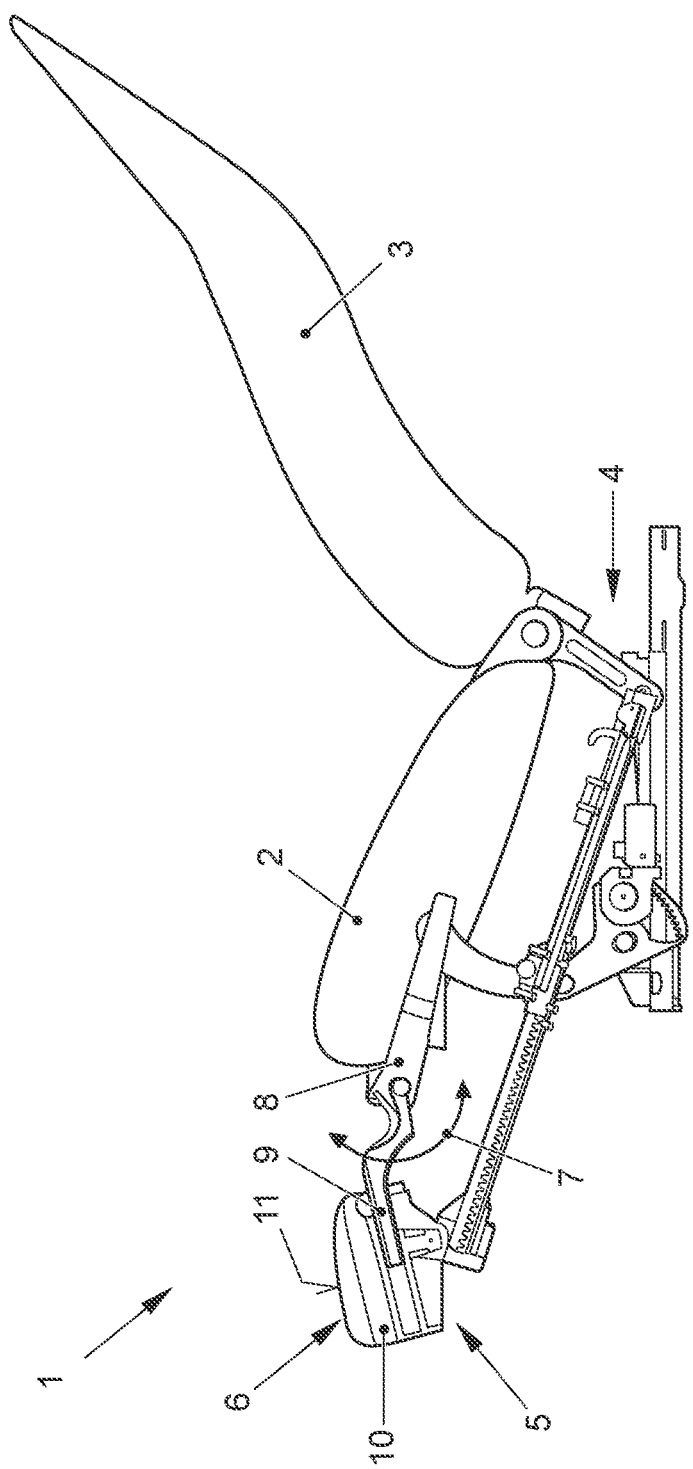
FIG. 1 shows a vehicle seat in a simplified side view.

FIG. 1 shows in a simplified side view an advantageous vehicle seat 1 for a motor vehicle. The vehicle seat 1 has a vehicle seat 1 with a backrest 3 arranged thereon in a displaceable manner. The seat part can be attached by a seat frame 4 to a vehicle floor of the motor vehicle. The seat frame 4 is designed such that the vehicle seat 1 can be shifted from an upright sitting position, in which the seat part 2 is essentially horizontally aligned and the backrest 3 is essentially vertically aligned, to the reclining position shown in FIG. 1, in which the backrest 3 and the seat part 2 are inclined in such a way that a comfortable reclining position for the user of the vehicle seat 1 results. Such a vehicle seat 1 is particularly advantageous for motor vehicles that enable autonomous driving.

In order to increase user comfort, in particular in the reclining position shown, the vehicle seat 1 also has a lower leg support device 5, which is assigned to the lower legs of a user using the vehicle seat 1. The lower leg support device 5 has a lower leg support 6, which can be moved between a vertically aligned non-use position essentially located below the seat part 2 and the use position shown in FIG. 1 located upstream of the seat part 2 in longitudinal extension of the vehicle seat and almost horizontally aligned, as indicated by a double arrow 7. For this purpose, the lower leg support 6 is mounted so as to pivot on a bracket 8 assigned to seat part 2.

The lower leg support 6 has a first support part 9, which is mounted so as to pivot on the bracket 8. On the first support part 9, two second support parts 10 are displaceably mounted in such a way that they can increase and reduce a lower leg support surface 11 formed by the lower leg support 6.

Figure 2A:
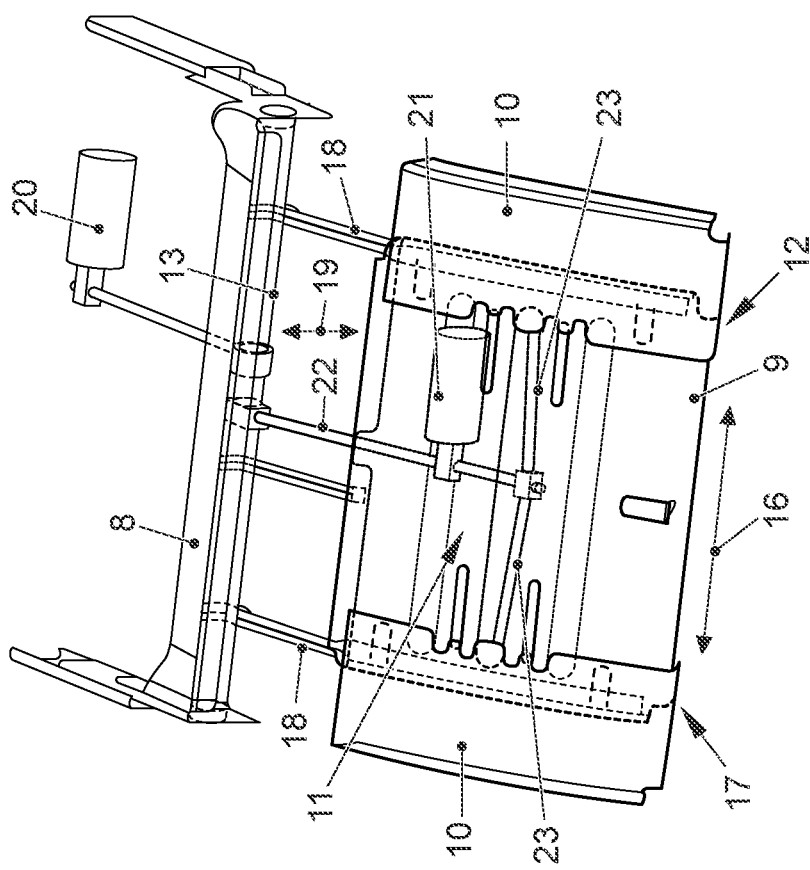
FIG. 2A shows a perspective view of an advantageous lower leg support device of the vehicle seat according to a first operating position.
Figure 2B:
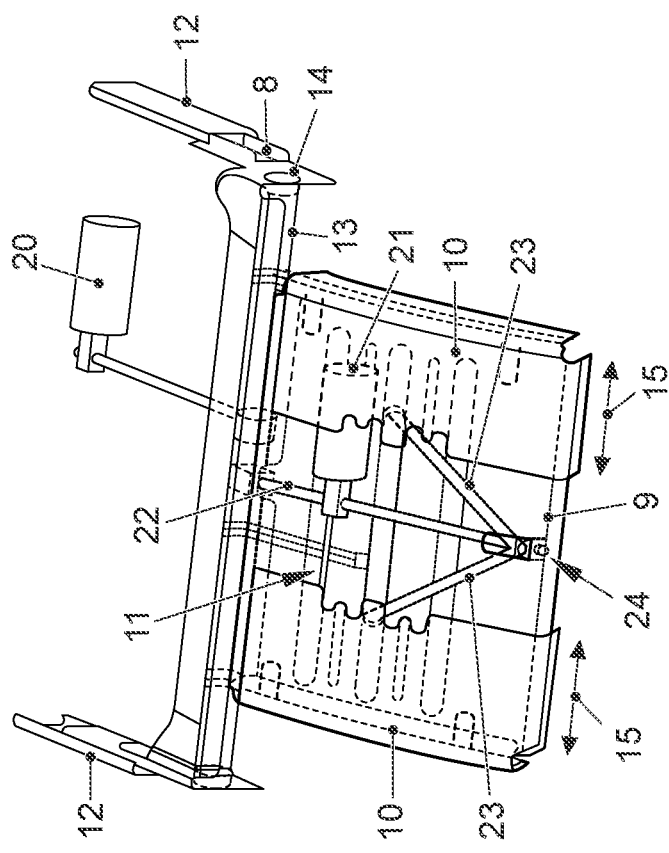
FIG. 2B shows the lower leg support device from FIG. 2A in a further operating position.

For this purpose, FIGS. 2A and 2B each show a perspective plan view of the lower leg support device in different operating states.

The bracket 8 is U-shaped, wherein its opposite longitudinal legs are displaceably mounted in a guide rail 12 of the seat part 2, so that the bracket 8 is displaceably mounted thereon in longitudinal extension of the seat part 2. At the free end of the bracket 8, the first support part 9 is mounted so as to pivot. For this purpose, the support part 9 has a bolt-shaped crossbar 13, which is rotatably mounted directly or with the interposition of a rolling element bearing, in bolt holders 14 of the bracket 8.

The support part 9 has at least an essentially rectangular base surface, wherein its longitudinal sides, which extend parallel to the longitudinal extension of the vehicle seat 1, are each assigned a second support part 10. In the storage position of the support parts 10 shown in FIG. 2A, these house the first support part 9 in areas. For this purpose, the support parts 10 cover the support part 9 in areas starting from its side edges. The support parts 10 are in particular mounted directly on the support part 9 in such a displaceable manner that they can be moved transversely to the longitudinal extension of the support part 9 on this, as indicated by double arrows 15 in FIG. 2A. If the support parts 10 are pulled out of the storage position shown in FIG. 2 into a use position, as shown in FIG. 2B, i.e., moved away from each other, according to a double arrow 16 in FIG. 2B, the support parts 10 free the support part 9 in areas, whereby the common lower leg support area 11 made available by the support parts 9 and 10 is increased, in particular widened.

Due to the advantageous lower leg support device 5, it is thus possible to increase user comfort by the width of the lower leg support 6 being adaptable to the needs of the user. In particular, the transverse displacement of the second support parts 10 is ensured by a rail guide 17, which is formed between the support parts 10 and the support part 9. In particular, the respective rail guide 17 is formed directly by the support parts 9 and 10, so that their shape forms the form-fitting rail guide. For this purpose, for example, each second support part 10 is provided with a C-shaped cross-section, through which the support part 9 can be form-fittingly embraced, so that the rail guide 17 is formed by the interaction of the second support part 10 pushed onto the support part 9.

Preferably, the support part 9 is also mounted longitudinally on the bracket 8. For this purpose, according to the present embodiment, it is provided that the support part 9 is mounted to be longitudinally shiftable on support struts 18, which are firmly connected to the crossbar 13. As a result, the support element 9 is indirectly mounted on the bracket 8 by the pivotable mounting of the support struts 18. In addition, the support element 9 can thus be moved in its longitudinal extension or in a longitudinal extension of the vehicle seat, as indicated by an arrow 19 in FIG. 2B, so that the distance of the lower leg support 6 to the seat part 2 can be further changed. According to the present embodiment, the bracket 8 is assigned an actuator 20, which is mechanically coupled with the crossbar 13 to automate the pivoting movement of the lower leg support 6 according to arrow 7. The actuator 20 is designed, for example, as an electromotive, pneumatic and/or hydraulic actuator, which is in particular electrically controllable or actuated.

Furthermore, advantageously the lower leg support 6 is assigned an actuator 21, which serves according to the present embodiment to cause both the longitudinal displacement of the support part 9 according to arrow 19 and the transverse displacement of the support parts 10 on the support part 9. For this purpose, the actuator 21, which is also preferably designed as an electromotive, pneumatic and/or hydraulically operating actuator, is coupled to a spindle rod 22, which is firmly mounted on one end of the crossbar 13 and extends in the direction of the support part 9 parallel to the support struts 18. The actuator 21, for example, has a spindle nut whose internal thread is in contact with the external thread of the spindle rod 22. The actuator 21 itself is advantageously firmly connected to the support part 9 or stored thereon, so that when the actuator 21 is actuated, the latter is moved along the spindle rod 22 according to arrow 19, thereby taking the support part 9 and the support parts 10 arranged thereon along accordingly.

At its free end facing away from the crossbar 13, the spindle rod 22 is coupled with two coupling rods 23. These coupling rods 23 are connected in an articulated manner at one end with the free end of the spindle rod 22 and at the other end with in each case one of the support parts 10. In the storage position according to FIG. 2A, the coupling rods 23 form an acute angle with the spindle rod 22 in the plan view. If the actuator 21 is now actuated, the actuator 21 is used to move the support part 9 away from the bracket 8. Because the free end of the spindle rod 22 has a fixed distance to the bracket 8, but the ends of the coupling rods 23 assigned to the support parts 10 are moved away from the bracket 8 with these, the coupling rods 23 are spread with an increase in the angle previously formed with the spindle rod 22, whereby the support parts 10 are pushed outwards to widen the lower leg support surface 11, so that the use position, as shown in FIG. 2B, is achieved. If the actuator 21 is now controlled in reverse, so that the support part 9 is moved in the direction of the bracket 8, the advantageous joint kinematics of the gearbox 24 formed by spindle rod 22 and coupling rods 23 cause the support parts 10 to be moved back toward each other or pushed in the direction of the storage position, whereby the contact surface 11 is narrowed.

As a result, with a single actuator 21, both the longitudinal adjustment and the widening or narrowing of the lower leg support surface 11 of the lower leg support 5 is realized.

As an alternative to the embodiment shown, the support parts 10 can also be moved or driven by a separate actuator, so that independently of the longitudinal adjustment of the support part 9 a narrowing or widening of the lower leg support surface 11 can be adjusted. An actuator-free design is also conceivable, in which at least the support parts 9 and 10 can be manually moved by the user to the desired position.

In particular, the kinematics of the lower leg support 6 or the lower leg support device 5 is coupled with that of the seat frame 4, as shown in the embodiment of FIG. 1. As a result, automatic actuation, or partial actuation of the lower leg support device 5 is carried out in the event of displacement of the vehicle seat 1 from the upright sitting position to the reclining position shown in FIG. 1 and vice versa.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lower leg support device for a vehicle seat, the lower leg support device comprising:
   a bracket; and
   a lower leg support adapted to be moved on the bracket and adapted to be moved between a non-use position and a use position upstream in a longitudinal extension, the lower leg support having at least two support parts movable relative to each other in order to increase or reduce a lower leg support surface of the lower leg support,
   wherein the at least two support parts are transversely displaceable in the longitudinal extension to each other in order to increase or reduce a width of the lower leg support surface.

2. The lower leg support device according to claim 1, wherein a first of the support parts is displaceably disposed on the bracket and at least a second of the support parts is displaceably disposed on the first support part.

3. The lower leg support device according to claim 1, wherein on the first support part, two second support parts are displaceably arranged on sides of the first support part facing away from each other.

4. The lower leg support device according to claim 1, wherein the second support part on the first support part is movable from a retracted storage position to an extracted use position and vice versa.

5. The lower leg support device according to claim 1, wherein the second support part on the first support part is mounted to be displaceable by a rail guide.

6. The lower leg support device according to claim 1, further comprising at least one controllable actuator, which is assigned at least to the second support part for its displacement.

7. The lower leg support device according to claim 6, wherein the at least one controllable actuator is coupled by a gearbox with the two second support parts for their displacement.

8. The lower leg support device according to claim 1, wherein the first support part is mounted longitudinally displaceably on the bracket.

9. The lower leg support device according to claim 1, wherein the first support part is assigned a controllable actuator for its longitudinal displacement.

10. The lower leg support device according to claim 9, wherein the controllable actuator, which is firmly connected to the first support part, is coupled with a spindle rod, which is attached to the bracket at one end, and wherein the controllable actuator is movable by its control along the spindle rod.

11. The lower leg support device according to claim 10, wherein the spindle rod is hingedly connected on a second end to at least one coupling rod, which is hingedly connected with one of the second support parts, and wherein the respective coupling rod with the spindle rod forms an acute angle in the retracted storage position.

12. The lower leg support device according to claim 1, wherein the first support part is mounted so as to pivot on the bracket.

13. The lower leg support device according to claim 1, wherein the bracket is assigned an actuator for pivoting the first support part.

14. A vehicle seat for a motor vehicle, comprising:
a seat part;
a backrest assigned to the seat part; and
a lower leg support device according to claim 1 arranged on the seat part.

* * * * *